US012578976B2

(12) United States Patent
Inan et al.

(10) Patent No.: US 12,578,976 B2
(45) Date of Patent: Mar. 17, 2026

(54) SYSTEMS AND METHODS FOR AFFINITY-DRIVEN INTERFACE GENERATION

(71) Applicant: Walmart Apollo, LLC, Bentonville, AR (US)

(72) Inventors: Aysenur Inan, Mountain View, CA (US); Shreyas Saiprasad Jadhav, San Francisco, CA (US); Hongyao Huang, Newark, CA (US); Hyun Duk Cho, San Francisco, CA (US); Yokila Arora, San Jose, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 169 days.

(21) Appl. No.: 18/428,292

(22) Filed: Jan. 31, 2024

(65) Prior Publication Data

US 2025/0245027 A1    Jul. 31, 2025

(51) Int. Cl.
*G06F 9/451* (2018.01)

(52) U.S. Cl.
CPC .................................... *G06F 9/451* (2018.02)

(58) Field of Classification Search
CPC ...................................................... G06F 9/451
See application file for complete search history.

(56) References Cited

U.S. PATENT DOCUMENTS

| | | | |
|---|---|---|---|
| 10,908,977 B1 * | 2/2021 | Ferstay | G06F 11/3476 |
| 11,416,285 B1 * | 8/2022 | Vergnes | G06F 9/5027 |
| 11,960,911 B1 * | 4/2024 | Mancuso | G06F 9/451 |
| 11,972,470 B2 * | 4/2024 | Downey | G06N 5/01 |
| 2012/0084122 A1 | 4/2012 | Boehle | |
| 2015/0120418 A1 | 4/2015 | Cervenka et al. | |

(Continued)

OTHER PUBLICATIONS

Singh et. al, "How do you ensure that your Loyalty Program rewards are relevant and valuable to your target audience," LinkedIn, 2023, p. 1-11.

(Continued)

*Primary Examiner* — Tadesse Hailu
(74) *Attorney, Agent, or Firm* — Morgan, Lewis & Bockius LLP; Manita Rawat

(57) ABSTRACT

Systems and methods of generating personalized interfaces are disclosed. An interface generation request is received and, in response to receiving the interface generation request, a plurality of user-relevant element bundles is selected. The plurality of user-relevant bundles is selected in part by a weighted random sampling process. In response to selecting the plurality of user-relevant element bundles, a set of interface elements associated with each of the plurality of user-relevant element bundles is ranked based on interface element relevance to a user associated with the interface generation request. Instructions to cause generation of an interface including at least one of the plurality of user-relevant element bundles and at least a top-ranked interface element selected from the set of interface elements associated with the at least one of the plurality of user-relevant element bundles are transmitted to a user device.

20 Claims, 12 Drawing Sheets

(56) References Cited

U.S. PATENT DOCUMENTS

2015/0379428 A1 * 12/2015 Dirac .................... G06N 20/00
706/12
2023/0306471 A1    9/2023  Kandath et al.

OTHER PUBLICATIONS

"Unlock 1:1 experience with Affinity-based personalization," Dynamic
Yield, 2023, p. 1-2.
"Guide to earning and redeeming," Amazon, 2023, p. 1-5.

\* cited by examiner

300

Receive Interface Request
302

Select User-Relevant Element Bundles
304

Rank Elements Associated with User-Relevant Bundles
306

Output Ranked Bundles and Ranked Elements
308

Generate User-Specific Interface(s)
310

Receive Feedback
312

Revise Bundle and/or Element Selection Weights
312

300

392b

392a

200

SYSTEMS AND METHODS FOR AFFINITY-DRIVEN INTERFACE GENERATION

TECHNICAL FIELD

This application relates generally to generation of user interfaces, and more particularly, to generation of improved user interfaces including interface element affinities.

BACKGROUND

Some current interface systems include elements that may be associated together based on certain attributes. Current interface systems may further allow users to selected interface elements related to the associated elements that may be selected by a user such that additional actions may be initiated when an associated element is subsequently selected by the user. Although bundled elements provide certain potential benefits to a user, the number elements within a bundle may make it difficult to for users to find relevant, associated interface elements within a larger catalog of interface elements.

For example, when attempting to find interface elements that are representative of bundled elements, some current interface systems require users to browse large sets of elements that may or may not be relevant and/or may or may not be associated with the bundled elements. Users may not be willing to spend the time necessary to review large volumes of potentially irrelevant and unrelated items to find those items that are included within a bundle. Although users may identify bundles of interest, these current systems may not provide sufficient identification or display of interface elements related to the bundles of interest and the user.

SUMMARY

In various embodiments, a system is disclosed. The system includes a non-transitory memory and a processor communicatively coupled to the non-transitory memory. The processor is configured to read a set of instructions to receive an interface generation request and, in response to receiving the interface generation request, select a plurality of user-relevant element bundles. The plurality of user-relevant bundles is selected in part by a weighted random sampling process. The processor is further configured to, in response to selecting the plurality of user-relevant element bundles, rank a set of interface elements associated with each of the plurality of user-relevant element bundles based on interface element relevance to a user associated with the interface generation request. The processor is further configured to transmit instructions to cause generation of an interface including at least one of the plurality of user-relevant element bundles and at least a top-ranked interface element selected from the set of interface elements associated with the at least one of the plurality of user-relevant element bundles.

In various embodiments, a computer-implemented method is disclosed. The computer-implemented method includes steps of receiving an interface generation request and, in response to receiving the interface generation request, selecting a plurality of user-relevant element bundles. The plurality of user-relevant bundles is selected in part by a weighted random sampling process. The computer-implemented method further includes a steps of, in response to selecting the plurality of user-relevant element bundles, ranking a set of interface elements associated with each of the plurality of user-relevant element bundles based on interface element relevance to a user associated with the interface generation request and transmitting instructions to cause generation of an interface including at least one of the plurality of user-relevant element bundles and at least a top-ranked interface element selected from the set of interface elements associated with the at least one of the plurality of user-relevant element bundles.

In various embodiments, a non-transitory computer readable medium having instructions stored thereon. The instructions, when executed by at least one processor, cause at least one device to perform operations including receiving an interface generation request and, in response to receiving the interface generation request, selecting a plurality of user-relevant element bundles. The plurality of user-relevant bundles is selected in part by a weighted random sampling process. The device us further configured to perform operations including, in response to selecting the plurality of user-relevant element bundles, ranking a set of interface elements associated with each of the plurality of user-relevant element bundles based on interface element relevance to a user associated with the interface generation request and transmitting instructions to cause generation of an interface including at least one of the plurality of user-relevant element bundles and at least a top-ranked interface element selected from the set of interface elements associated with the at least one of the plurality of user-relevant element bundles.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
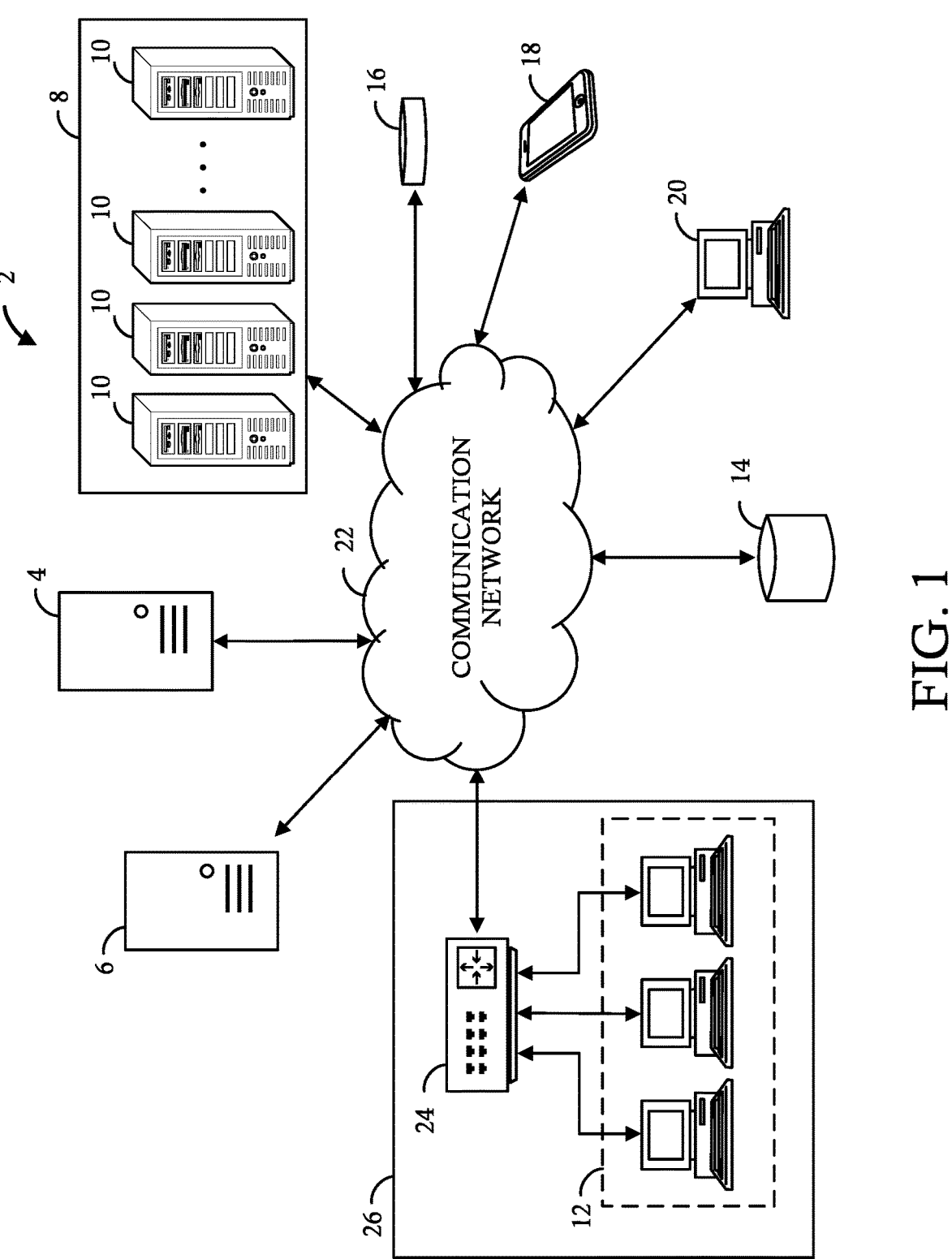
FIG. 1 illustrates a network environment configured to provide affinity-driven interface generation, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for affinity-driven interface generation including content bundles. In various embodiments, a set of element bundles are defined and associated with a network interface. Each of the element bundles includes at least two elements having a shared attribute that are associated together. When a user interacts with an element associated with an element bundle, for example by selecting an interface element representative of the element associated with the element bundle, one or more operations and/or interface modifications are generated in response. An interface generation system is configured to receive a selection of at least one element bundle and generate an interface including one or more elements associated with each of the selected element bundles that are also relevant to a user associated with the selection. For example, in some embodiments, selection of a first element bundle may result in generation of an interface including interface elements representative of a set of N elements associated with the first bundle and having a highest user-affinity score for a user associated with the selection of the first bundle.

In some embodiments, the disclosed methods and systems for affinity-driven interface generation provide a two-stage interface personalization process. The two-stage interface personalization process is configured to provide one or more user interfaces that include a first level of personalization configured to identify and display element bundles that are relevant to a first user and a second level of personalization configured to identify and display elements associated with the relevant element bundles that are relevant to the first user. In various embodiments, a bundle selection model may be configured to apply a first machine learning framework to select one or more relevant element bundles and an element selection model may be configured to apply a second machine learning framework to select one or more relevant items from the one or more relevant element bundles.

In some embodiments, systems and methods for affinity-driven interface generation include one or more trained content selection models. The trained content selection models may include one or more models, such as a bundle selection model and/or an element selection model. The trained content selection models are configured to select user-relevant content for inclusion within a generated interface based on feedback received through user interactions with prior and current interfaces. A trained bundle selection model may include a transaction based ranking framework and/or a weighted random sampling framework. A trained element selection model may include an affinity weighted framework.

In general, a trained function mimics cognitive functions that humans associate with other human minds. In particular, by training based on training data the trained function is able to adapt to new circumstances and to detect and extrapolate patterns. In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

FIG. 1 illustrates a network environment 2 configured to provide affinity-drive interface generation, in accordance with some embodiments. The network environment 2 includes a plurality of devices or systems configured to communicate over one or more network channels, illustrated as a network cloud 22. For example, in various embodiments, the network environment 2 may include, but is not limited to, an affinity-driven interface generation computing device 4, a web server 6, a cloud-based engine 8 including one or more processing devices 10, a database 14, and/or one or more user computing devices 16, 18, 20 operatively coupled over the network 22. The affinity-driven interface generation computing device 4, the web server 6, the processing device(s) 10, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the affinity-driven interface generation computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the affinity-driven interface generation computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the affinity-driven interface generation computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the affinity-driven interface generation computing device 4, for example. The workstation(s) 12 may communicate with the affinity-driven interface generation computing device 4 over the communication network 22. The workstation(s) 12 may send data to, and receive data from, the affinity-driven interface generation computing device 4. For example, the workstation(s) 12 may transmit data related to tracked operations performed at the physical location 26 to affinity-driven interface generation computing device 4.

Although FIG. 1 illustrates three user computing devices 16, 18, 20, the network environment 2 may include any number of user computing devices 16, 18, 20. Similarly, the network environment 2 may include any number of the affinity-driven interface generation computing device 4, the web server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the affinity-driven interface generation computing device 4, the web server 6, the workstation(s) 12, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the first user computing device 16, the second user computing device 18, and the Nth user computing device 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as searching one or more databases or catalogs associated with the displayed website, view item data for elements associated with and displayed on the website, and click on interface elements presented via the website, for example, in the search results. The website may capture these activities as user session data, and transmit the user session data to the affinity-driven interface generation computing device 4 over the communication network 22. The website may also allow the user to interact with one or more of interface elements to perform specific operations, such as selecting one or more items for further processing. In some embodiments, the web server 6 transmits user interaction data identifying interactions between the user and the website to the affinity-driven interface generation computing device 4.

In some embodiments, the affinity-driven interface generation computing device 4 may execute one or more models, processes, or algorithms, such as a machine learning model, deep learning model, statistical model, etc., to identify user relevant content for inclusion within one or more generated interfaces. The affinity-driven interface generation computing device 4 may transmit selected content and/or content identifiers to the web server 6 over the communication network 22, and the web server 6 may display interface elements associated with selected content on the website to the user. For example, the web server 6 may display interface elements associated with selected content to the user on a homepage, a catalog webpage, an item webpage, a window or interface of a chatbot, a search results webpage, or a post-transaction webpage of the website (e.g., as the user browses those respective webpages).

In some embodiments, the web server 6 transmits a content request to the affinity-driven interface generation computing device 4. The content request may be a request for element bundles (e.g., interface elements representative of one or more element bundles) and/or individual elements (e.g., interface elements representative of one or more individual elements associated with a network interface).

The affinity-driven interface generation computing device 4 is further operable to communicate with the database 14 over the communication network 22. For example, the affinity-driven interface generation computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the affinity-driven interface generation computing device 4, in some embodiments, the database 14 may be a local storage device, such as a hard drive, a non-volatile memory, or a USB stick. The affinity-driven interface generation computing device 4 may store interaction data received from the web server 6 in the database 14. The affinity-driven interface generation computing device 4 may also receive from the web server 6 user session data identifying events associated with browsing sessions, and may store the user session data in the database 14.

In some embodiments, the affinity-driven interface generation computing device 4 generates training data for a plurality of models (e.g., machine learning models, deep learning models, statistical models, algorithms, etc.) based on aggregation data, variant-level data, holiday and event data, recall data, historical user session data, search data, purchase data, catalog data, advertisement data for the users, etc. The affinity-driven interface generation computing device 4 and/or one or more of the processing devices 10 may train one or more models based on corresponding training data. The affinity-driven interface generation computing device 4 may store the models in a database, such as in the database 14 (e.g., a cloud storage database).

The models, when executed by the affinity-driven interface generation computing device 4, allow the affinity-driven interface generation computing device 4 to select user relevant element bundles and/or elements associated with selected user relevant element bundles and relevant to the associated user. For example, the affinity-driven interface generation computing device 4 may obtain one or more models from the database 14. The affinity-driven interface generation computing device 4 may then receive, in real-time from the web server 6, a user identifier and/or an interface personalization request including a user identifier. In response to receiving the interface personalization request, the affinity-driven interface generation computing device 4 may execute one or more models to identify a set of element bundles relevant to (e.g., having a highest relevance score) with respect to the user identifier. The affinity-driven interface generation computing device 4 may execute one or more additional models to identify individual elements associated with the set of element bundles and that are independently relevant to the user identifier.

In some embodiments, the affinity-driven interface generation computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, the affinity-driven interface generation computing device 4 may generate a set of user-specific interface elements for inclusion within an interface and/or an interface including a set of user-specific interface elements.

Figure 2:
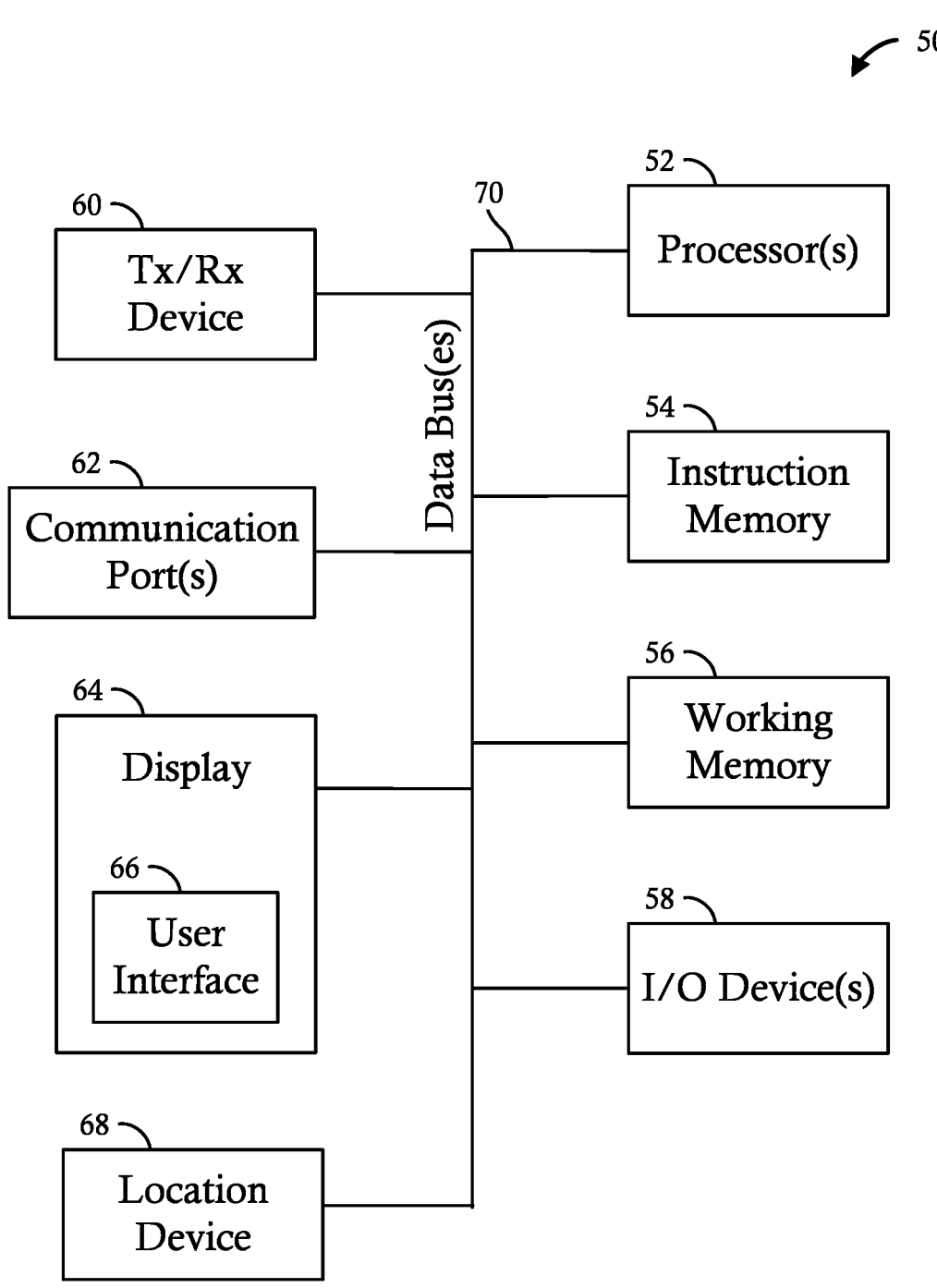
FIG. 2 illustrates a computer system configured to implement one or more processes, in accordance with some embodiments.

FIG. 2 illustrates a block diagram of a computing device 50, in accordance with some embodiments. In some embodiments, each of the affinity-driven interface generation computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses

70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for content selection and interface generation, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1xRTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interaction with selected interface elements. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
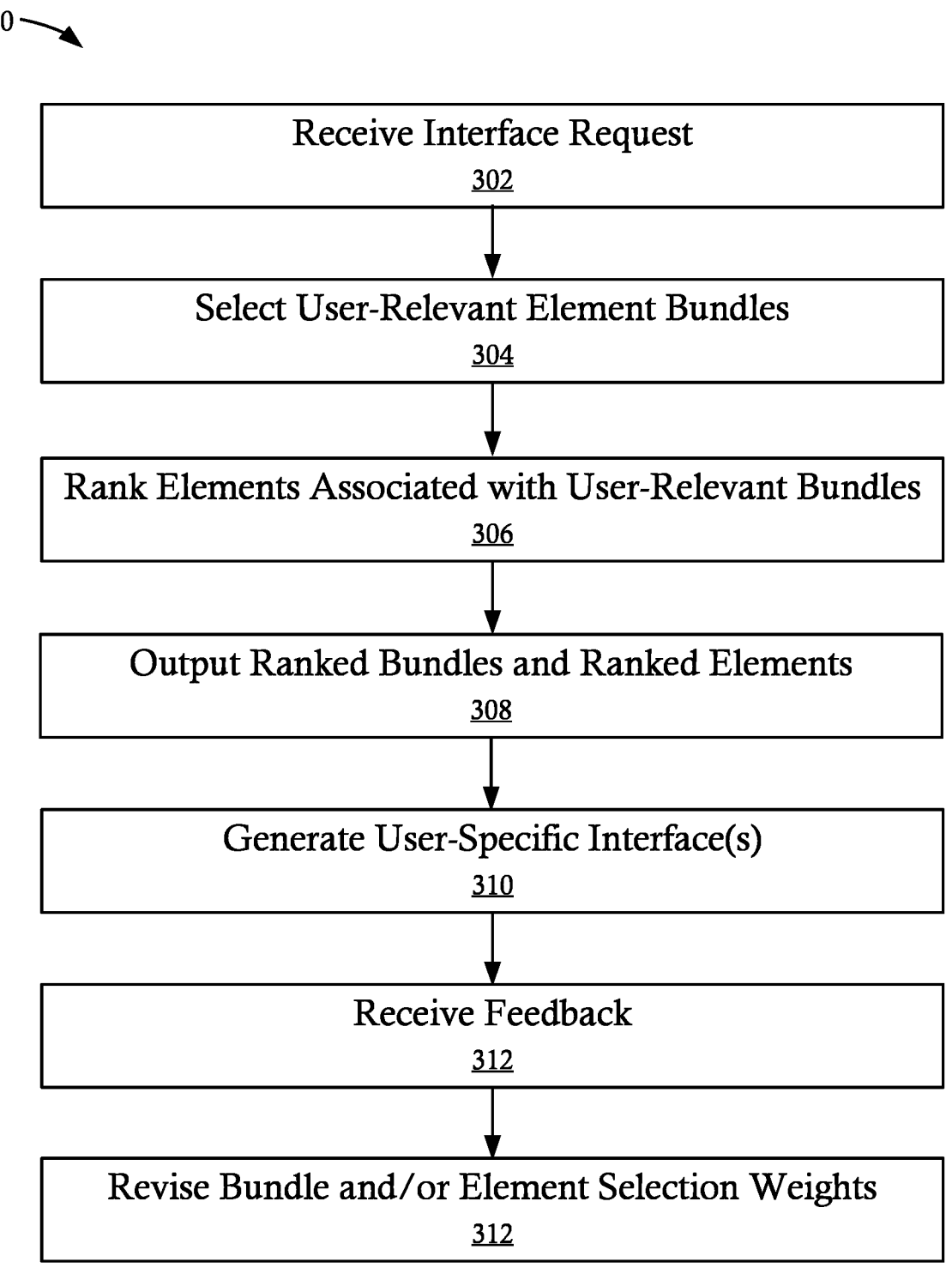
FIG. 3 is a flowchart illustrating a content selection and interface generation method, in accordance with some embodiments.
Figure 4:
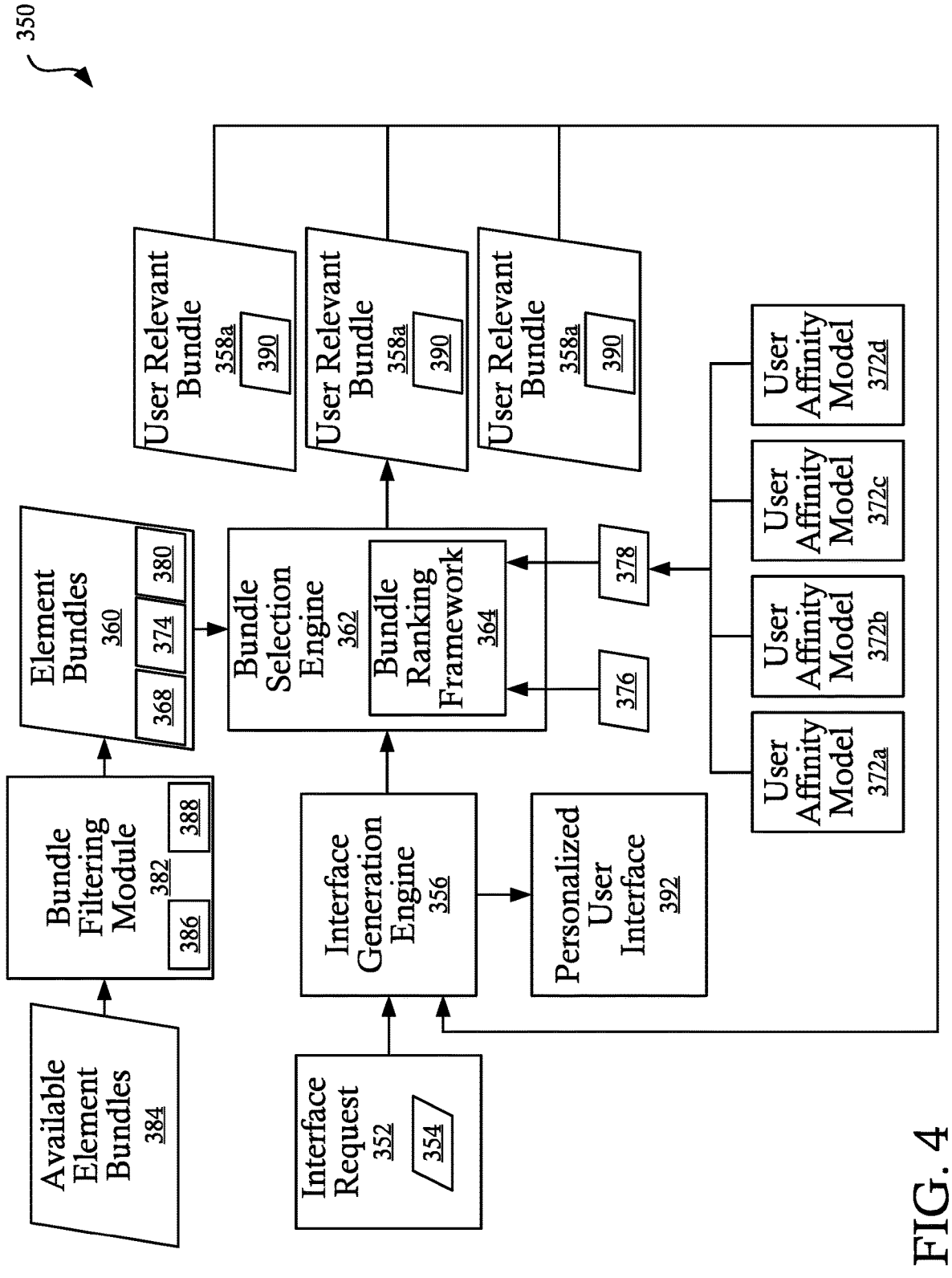
FIG. 4 is a process flow illustrating various steps of the content selection and
interface generation method of FIG. 3, in accordance with some embodiments.

FIG. 3 is a flowchart illustrating a content selection and interface generation method 300, in accordance with some embodiments. FIG. 4 is a process flow 350 illustrating various steps of the content selection and interface generation method 300, in accordance with some embodiments. The content selection and interface generation method 300 may be implemented by any suitable system. For example, the content selection and interface generation method 300 may be implemented by the affinity-driven interface generation computing device 4 illustrated in FIG. 1. Although specific embodiments are discussed herein, it will be appreciated that the content selection and interface generation method 300 may be implemented by any suitable system utilizing any suitable set of engines and/or modules, as discussed herein.

At step 302, an interface request 352 is received. The interface request 352 may be transmitted by any suitable system, such as a user computing device 16, and may be received by any suitable system and/or any suitable engine or module, such as the affinity-driven interface generation computing device 4 and/or an interface generation engine 356. In some embodiments, the interface request 352 includes a user identifier 354 associated with a user of the corresponding user computing device 16. The interface request 352 may include additional data, such as an interface identifier, session data, interface state identifiers, etc.

At step 304, one or more user-relevant element bundles 358a-358c (collectively "user-relevant element bundles 358") is selected from a plurality of element bundles 360. The user-relevant element bundles 358 includes one or more element bundles relevant to the user identifier 354 (e.g., relevant to a user associated with the user identifier 354). Each of the element bundles 360 may include a data structure defining a one-to-many mapping having associations between a bundle identifier and two or more elements in a catalog associated with the corresponding network environment. The two or more elements may include one or more shared features or parameters. In some embodiments, each of the element bundles 360 includes one or more actions that may be executed and/or one or more modifications that may be applied to one or more corresponding elements in response to sequential interactions including an interaction with an element bundle and an interaction with an element associated with the element bundle.

As one non-limiting example, in the context of an e-commerce environment, element bundles 360 may be referred to as "offers" and may include a set of items selected from an item catalog associated with the e-commerce environment. Each of the items may include one or more shared attributes, such as, a brand, a type, a partial title, etc. For example, a first element bundle (e.g., first offer) may define a set of items having a shared brand attribute (e.g., Brand X) and a shared product type attribute (e.g., Product Y) such that the set of items includes items of [Brand X, Product Y, Variable$_1$, Variable$_2$, . . . , Variable$_n$] where each Variable is representative of one or more variations of the product (e.g., size, flavor, color, etc.). Each of the element bundles 360 may include all of the items in a corresponding item catalog having the shared attribute(s) and/or may include a curated subset of the items in the corresponding item catalog having the shared attribute(s). Although specific embodiments are discussed herein, it will be appreciated that any suitable attribute(s) may be used to build one or more of the element bundles 360.

Each of the element bundles 360 may include an attribute adjustment to be applied to each item in a set of items associated with the corresponding one of the element bundles 360 when an interaction occurs between both an element bundle and an element associated with the selected element bundle. For example, in the context of an e-commerce environment, element bundles 360 may include one or more attribute adjustments for items associated with the element bundle, such as one or more price attribute adjustments. Although specific embodiments are discussed herein, it will be appreciated that any suitable attribute adjustment (s) may be defined by each of the element bundles 360 and applied to items associated with a selected one of the element bundles 360, as discussed in greater detail below.

In some embodiments, the user-relevant element bundles 358 358 are selected by a bundle selection engine 362. The bundle selection engine 362 may be configured to receive at least a portion of an interface request 352, such as a user identifier 354, and the set of element bundles 360, and output the set of user-relevant element bundles 358. The bundle selection engine 362 may implement one or more trained models and/or frameworks, such as one or more trained ranking frameworks 364, to select the set of user-relevant element bundles 358. Although embodiments are discussed herein including a separate bundle selection engine 362, it will be appreciated that the bundle selection engine 362 may be incorporated at least partially and/or entirely within one or more other engines or modules, such as, for example, the interface generation engine 356.

In some embodiments, a trained ranking framework 364 is configured to receive one or more inputs, such as a user identifier 354 and a set of element bundles 360, and output a ranked set of user-relevant element bundles 358 and a set of ranked individual elements 380a, 380b, 380c (collectively "sets of ranked individual elements 380") for each of the user-relevant bundles 358. The ranking framework 364 may be configured to apply a weighted ranking processes utilizing one or more weights generated based on historic interaction data to rank each of the element bundles and/or elements associated with each of the element bundles 360. In some embodiments, the ranking framework 364 includes a plurality of interconnected models and/or layers configured to implement one or more frameworks.

In some embodiments, a ranking framework 364 is configured to receive inputs including element bundle data 368, element bundle distribution data 374, user affinity data 376, and user interaction data 378 and output the ranked set of user-relevant element bundles 358 and sets of ranked individual elements 380 for each of the user-relevant element bundles 358. The ranking framework 364 may be trained based on user interactions with element bundles and subsequent interactions with elements associated with each of the element bundles. For example, in the context of an e-commerce environment, the bundle ranking framework may be configured as a clipped ultimately bought (CUB) model configured to apply a set of model weights representative of user affinity based on whether a user selected (e.g., clipped) an offer and then subsequently interacted with (e.g., purchased) at least one item associated with the selected offer.

The element bundle data 368 may include data defining each of the element bundles 360 and/or portions of each of the element bundles 360. The element bundle data 368 may include a plurality of data structures, such as element bundle data structures. Each of the data structures may include, but is not limited to, a bundle identifier, a set of element identifiers for each element associated with the bundle, one or more bundle adjustments and/or actions, and/or any other suitable bundle data. Although specific embodiments are discussed herein, it will be appreciated that any suitable data structure(s) may be used to represent each of the element bundles 360.

The element bundle distribution data 374 may include data defining a distribution of element features within a corresponding one of the element bundles 360. For example, in the context of an e-commerce environment, element bundle distribution data 374 may include data identifying distribution of features such as flavor, size, color, type, etc. Although shown as a separate data element, it will be appreciated that element bundle distribution data 374 may be included in the element bundle data 368 provided for each of the element bundles 360, for example, as a data element within a data structure defining each of the element bundles 360. Element bundle distribution data 374 may include raw distribution numbers (e.g., total count numbers for each feature value across the elements associated with an element bundle), normalized distribution numbers, percentage distributions, and/or any other suitable format.

In some embodiments, user affinity data 376 is representative of a user affinity (e.g., preference) for one or more feature values associated with one or more elements in a network catalog. User affinity data 376 may be generated by a user understanding engine 370 configured to implement a plurality of affinity models 372a-372d (referred to herein as "affinity models 372"). For example, in the context of an e-commerce environment, the affinity models 372 may include, but are not limited to, a brand affinity model, a flavor affinity model, a price affinity model, a product type affinity model, etc. Each of the affinity models 372 may utilize any suitable model framework and may be configured to output the user affinity data 376 in any suitable format.

In some embodiments, user interaction data 378 is representative of user interactions with one or more previously presented element bundles and/or elements. For example, user interaction data 378 may include data representative of interactions (e.g., clicks or selections) of element bundles by one or more users and subsequent element interactions (e.g., clicks, selections, etc.) with individual interface elements associated with a selected element bundle. In the context of an e-commerce environment, prior interactions with element bundles (e.g., offers) may be referred to as "clipping" the element bundle.

In some embodiments, the ranking framework 364 is configured to apply a set of model weights to rank the element bundles 360 (and/or a subset thereof) to identify user-relevant element bundles 358. The set of model weights may be generated by an iterative process based on and/or configured to generate labeled interaction data. The labeled interaction data may include any suitable interaction data, such as, for example, user interaction data for element bundles and/or individual elements associated with element bundles. In some embodiments, labeled datasets may include a plurality of entries each denoting an interaction and one or more features of the interaction (e.g., a user identifier, an element bundle identifier, an element identifier, one or more element features, etc.). Each of the plurality of entries may be labeled with one of two labels, for example, a label of 1 where a predetermined interaction has occurred and a label of 0 where the predetermined interaction did not occur.

As one non-limiting example, in the context of an e-commerce environment, the plurality of entries in a dataset may include a plurality of transactional interactions. Each of the plurality of transactional interactions may include one or more of a user identifier, a bundle (e.g., offer) identifier, an element (e.g., item) identifier, one or more item features, one or more feature affinity values, and a label having a value of 1 when the user interacted with (e.g., clipped) the offer and the user interacted with (e.g., purchased) the item after clipping the offer. Although specific embodiments are discussed herein, it will be appreciated that any suitable plurality of entries may be utilized to generate model weights for the ranking framework 364.

In some embodiments, the ranking framework 364 is configured to apply a set of weights for one or more features associated with the element bundles 360 and/or the set of elements associated with one or more of the element bundles 360. For example, in the context of an e-commerce environment, a ranking framework 364 may apply a set of weights including a brand weight, a price weight, an item type weight, and a flavor weight. Although specific embodiments are discussed herein, it will be appreciated that the ranking framework 364 may apply any suitable set of weights based on any suitable features associated with the element bundles 360 and/or the set of elements associated with each of the element bundles 360. Further, it will be appreciated that any suitable subset of features may be selected for weight generation and used to rank each of the element bundles 360 based on the context of the network environment and/or one or more ranking goals.

In some embodiments, the set of weights applied by the ranking framework 364 includes one or more distribution weights. For example, in the context of an e-commerce network environment, the one or more distribution weights may include, but are not limited to, a brand distribution weight, a flavor distribution weight, a product type distribution weight, a price band distribution weight, etc. The distribution weights may be provided to identify user affinity to an element bundle based on a user affinity to a distribution within the element bundle. For example, if an element bundle includes a high distribution of items having flavor X, where the user has a high affinity for flavor X, the element bundle will have a higher user affinity as compared to a similar bundle with a high distribution of items having flavor Y, where the user has a low affinity for flavor Y.

In some embodiments, the element bundles 360 provided to ranking framework 364 may include a subset of all available element bundles associated with the network environment. For example, the element bundles 360 may include a subset of available element bundles selected by an initial bundle filtering module 382. The initial bundle filtering module 382 may be configured to apply one or more frameworks and/or processes, such as a transaction based ranking process, a weighted random sampling process, and/ or any other suitable process, to identify the set of element bundles 360 to be provided to the ranking framework 364. In some embodiments, a set of available bundles 384 associated with the network environment (e.g., identifiers, data structures, and/or other data elements associated with each bundle in the set of available bundles 384) is received by the initial bundle filtering module 382. The initial bundle filtering module 382 may apply one or more frameworks, such as a transaction based ranking framework 386 and a weighted random sampling framework 388, to select a subset of the available bundles (e.g., the element bundles 360 to be provided to the ranking framework 364). In some embodiments, a transaction based ranking framework 386 and a weighted random sampling framework 388 are applied sequentially.

Figure 5:
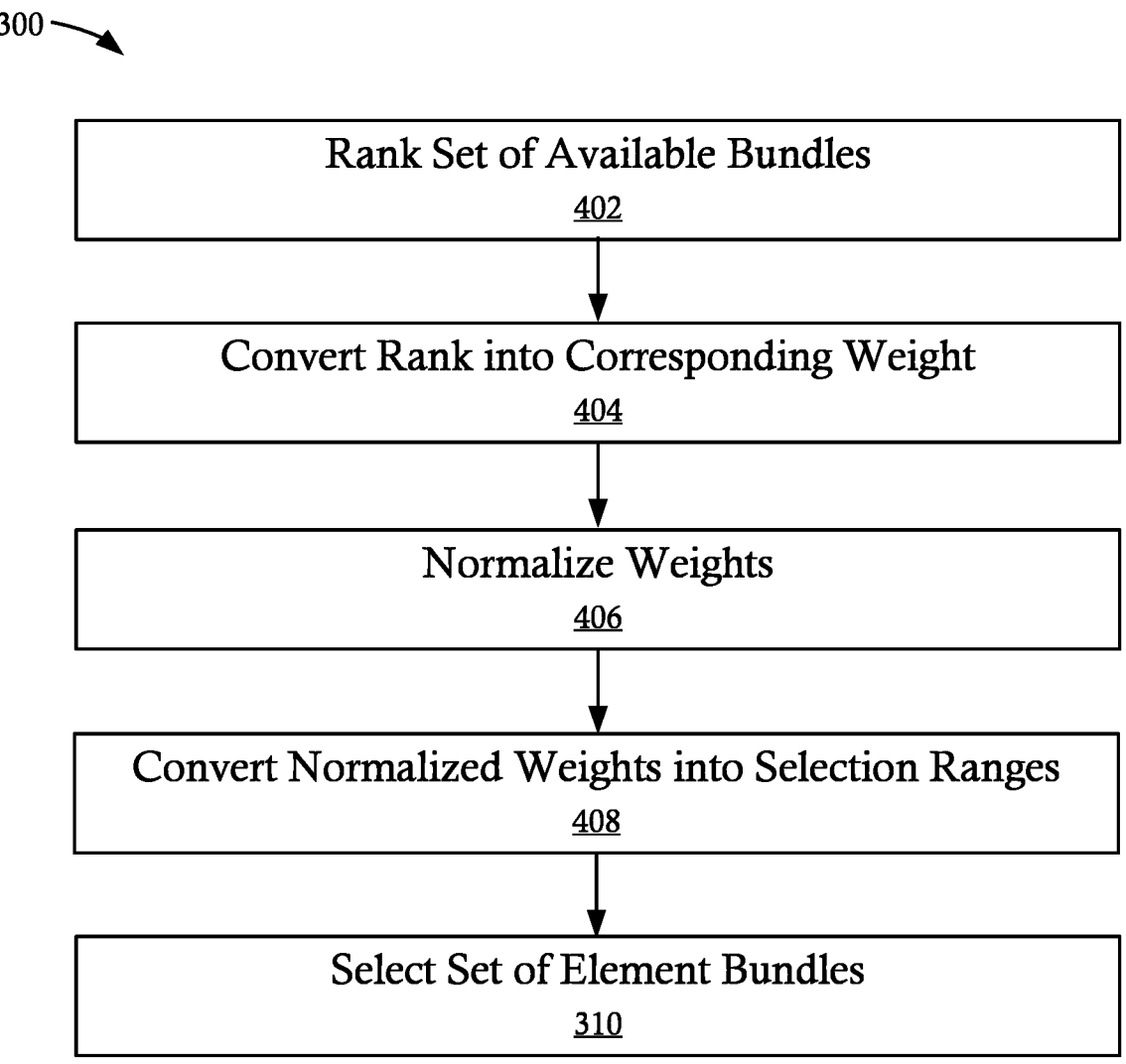
FIG. 5 is a flowchart illustrating a bundle selection process, in accordance with some embodiments.

The initial bundle filtering module 382 may be configured to apply a bundle filtering process 400, as illustrated in FIG. 5. At step 402, the set of available bundles 384 may be ranked according to one or more transactional rankings, such as, for example, based on a number of interactions. A transaction based ranking framework 386 may be configured to rank the available bundles 384 by interactions. For example, an element bundle having a highest number of interactions (e.g., clicks, clips, views, add-to-carts, etc.) may be ranked first, e.g., rank 1, an element bundle having a second highest number of interactions may be ranked second, e.g., rank 2, etc., continuing until the element bundle having the lowest number of interactions is ranked last, e.g., rank n where n is the number of element bundles in the plurality of available element bundles 384. Element bundles having the same number of interactions may have the same rank, may be randomly ranked with respect to each element bundle having the same rank, and/or may be ranked by applying one or more tiebreakers (e.g., an available time period associated with the element bundles, one or more metrics of the elements associated with the element bundle, etc.).

At step 404, the rank of each of the available bundles 384 is converted into a weight associated with the corresponding element bundle. A rank (r) may be converted into a weight (w) according to the equation w=1/r. For example, in an embodiment including five ranked element bundles, a first ranked (e.g., rank 1) element bundle has a weight of 1 (e.g., 1/1), a second ranked (e.g., rank 2) element bundle has a weight of 0.5 (e.g., ½), a third ranked (e.g., rank 3) element bundle has a weight of 0.33 (e.g., ⅓), a fourth ranked (e.g., rank 4) element bundle has a weight of 0.25 (e.g., ¼), and a fifth ranked (e.g., rank 5) element bundle has a weight of 0.2 (e.g., ⅕). Although specific embodiments are discussed herein, it will be appreciated that any suitable number of available element bundles 384 may have a corresponding rank converted into a weight.

At step 406, the weight of each of the available bundles 384 is normalized. A weight ($w_i$) (where i is an index corresponding to the rank of the potential element bundle) may be normalized according to the equation $w_{i_n} = w_i / \Sigma_w$, e.g., the weight of a particular potential element bundle may be normalized by dividing the weight by a sum of weights for all of the potential element bundles 384. To continue the non-limiting example from above, the first ranked element bundle has a normalized weight of 0.44 (e.g., 1/(1+0.5+ 0.33+0.25+0.2) or 1/2.28), the second ranked element bundle has a normalized weight of 0.22 (e.g., 0.5/2.28), the third ranked element bundle has a normalized weight of 0.14 (e.g., 0.33/2.28), the fourth ranked element bundle has a normalized weight of 0.11 (e.g., 0.25/2.28), and the fifth ranked element bundle has a normalized weight of 0.09 (e.g., 0.2/2.28).

At step 408, the normalized weights for each of the available bundles 384 may be converted into selection ranges for selection of one or more of the available bundles. For example, a weighted random sampling framework 388 may define one or more selection ranges for each of the available bundles 384 based on a normalized weight of the corresponding element bundle. A selection range may be defined by adding a normalized weight to an upper bound of a prior selection range for each subsequent ranked element bundle. To continue the non-limiting example from above, a first selection range of 0-0.44 (e.g., starting at 0 as there is no prior selection range up to 0.44, the normalized weight of the first ranked element bundle) may be defined for the first ranked element bundle, a second selection range of 0.44- 0.66 may be defined for the second ranked element bundle, a third selection range of 0.66-0.8 may be defined for the third ranked element bundle, a fourth selection range of 0.8-0.91 may be defined for the fourth ranked element bundle, and a fifth selection range of 0.91-1.0 may be defined for the fifth ranked element bundle.

The selection ranges may be inclusive, exclusive, and/or partially inclusive and partially exclusive. Continuing the prior example, the first selection range may be inclusive of both 0 and 0.44, the second selection range may be exclusive of 0.44 and inclusive of 0.66, the third selection range may be exclusive of 0.66 and inclusive of 0.8, the fourth range may be exclusive of 0.8 and inclusive of 0.91, and the fifth range may be exclusive of 0.91 and inclusive of 1. Although certain embodiments are discussed herein, it will be appreciated that selection ranges may be defined to be inclusive and/or exclusive according to any suitable scheme and/or system requirements.

At step 410, a set of element bundles 360 may be selected and provided to a ranking framework, such as the ranking framework 364. For example, the weighted random sampling framework 388 may The weighted random sampling framework 388 may generate a random number within the total selection range (e.g., a random number between 0 and 1 for the above example) and select a corresponding element bundle based on the randomly generated number. Continuing the prior example, if the randomly generated number is between 0 and 0.44 (inclusive), the first element bundle is selected for inclusion in a set of element bundles 360 to be provided to the ranking framework 364, if the randomly generated number is between 0.44 (exclusive) and 0.66 (inclusive) the second element bundle is selected, etc. In some embodiments, multiple random numbers may be generated to provide for selection of a predetermined number of element bundles for inclusion in the set of element bundles 360 to be provided to the ranking framework 364 and/or additional random numbers may be generated if an element bundle is to be selected more than once.

The use of selection ranges based on normalized weights generated from interaction rankings allows for the removal of some popularity bias with respect to the selected set of element bundles to be provided to the ranking framework 364. For example, ranking and selection purely on interaction (e.g., popularity) may result in a feedback loop that causes the most popular element bundles to be selected and presented, resulting in more interactions with those element bundles, and therefore increasing their popularity further beyond less popular bundles, even where less popular bundles may have a higher user relevance for a specific user. By applying a weighted random sampling process, the disclosed systems and methods allow for curated, randomized selection of element bundles that provides a mix of higher and lower ranked bundles that leverages the popularity of higher ranked bundles while maintaining the potential for lower ranked bundles to be selected, ranked, and/or interacted with.

The available bundles 384 may be received from a promotion engine 366. Each of the available bundles 384 may include one or more data elements such as data elements identifying a set of elements associated with the element bundle, data elements defining availability of the element bundle such as a time period during which the element bundle is available, data elements defining user eligibility for the element bundle, data elements identifying distribution of one or more attributes within the set of elements associated with the element bundle, etc. In some embodiments, the available bundles 384 are provided from the promotion engine 366 to a data storage mechanism (not shown) and obtained from the data storage mechanism by, for example, the initial bundle filtering module 382.

With reference again to FIGS. 3-4, at step 306, the set of elements 380 associated with each of the user-relevant element bundles 358 are ranked to generate a set of affinity ranked elements 390. The set of affinity ranked elements 390 may be determined by, for example, the ranking framework 364 and/or a separate ranking framework configured to apply one or more weights corresponding to one or more user affinities for one or more features associated with the elements of one of the user-relevant element bundles 358. Each element in the set of elements 380 may be ranked based on one or more weights and/or one or more affinities. For example, in the context of an e-commerce environment, one or more items in a set of elements 380 may be ranked based on a brand weight and brand affinity, a price band weight and price band affinity, a flavor weight and flavor affinity, and a product type weight and product type affinity. Although specific embodiments are discussed herein, it will be appreciated that any suitable feature affinities and corresponding feature weights may be used to rank elements within a set of elements 380 associated with one of the user-relevant element bundles 358.

At step 308, the set of user-relevant element bundles 358 and the sets of ranked elements 390 associated with each of the user-relevant element bundles 358 are provided to the interface generation engine 356. At step 310, one or more personalized user interfaces 392 including one or more of the user-relevant element bundles 358 and one or more the elements within the corresponding set of ranked elements 390 are generated by the interface generation engine 356. A generated personalized user interface 392 may include additional user interface elements, such as search elements, default elements, user-specific elements, etc. in addition to the one or more of the user-relevant element bundles 358 and one or more the elements within the corresponding set of ranked elements 390. Although specific embodiments are discussed herein, it will be appreciated that any suitable interface(s) may be generated by the interface generation engine 356.

In some embodiments, the interface generation engine 356 is configured to obtain one or more interface templates and complete the interface templates using, at least in part, one or more of the user-relevant element bundles 358 and one or more of the elements in the set of ranked elements 390 corresponding to the one or more user-relevant element bundles 358. One or more interface templates may be obtained from a storage mechanism, such as, for example, database (e.g., database 14).

At optional step 312, feedback data may be received representative of one or more user interactions with a generated personalized user interface 392 and/or portions of a generated personalized user interface 392. For example, feedback data may be representative of user selections of presented user-relevant element bundles 358 and/or interactions with selections of presented ranked elements 390 associated with one or more user-relevant element bundles 358. As another example, feedback data may be representative of a lack of user interactions, for example, indicating presentation of one or more user-relevant element bundles 358 and/or ranked elements 390 without corresponding user interactions for selection of the presented elements. It will be appreciated that any suitable feedback data may be generated and/or received in response to generation of one or more personalized user interfaces 392.

At option step 314, one or more of the weights applied during a content selection and interface generation method 300 may be revised and/or recalculated based, at least in part, on the feedback data received at optional step 312. For example, in some embodiments, user interactions and/or a lack of user interactions may be utilized to adjust user affinity weights for one or more features considered by a ranking framework 364. Although specific embodiments are discussed herein, it will be appreciated that any suitable adjustments may be made based on the received feedback data to increase accuracy of selection of user-relevant element bundles 358 and/or ranked elements 390.

Figure 6B:
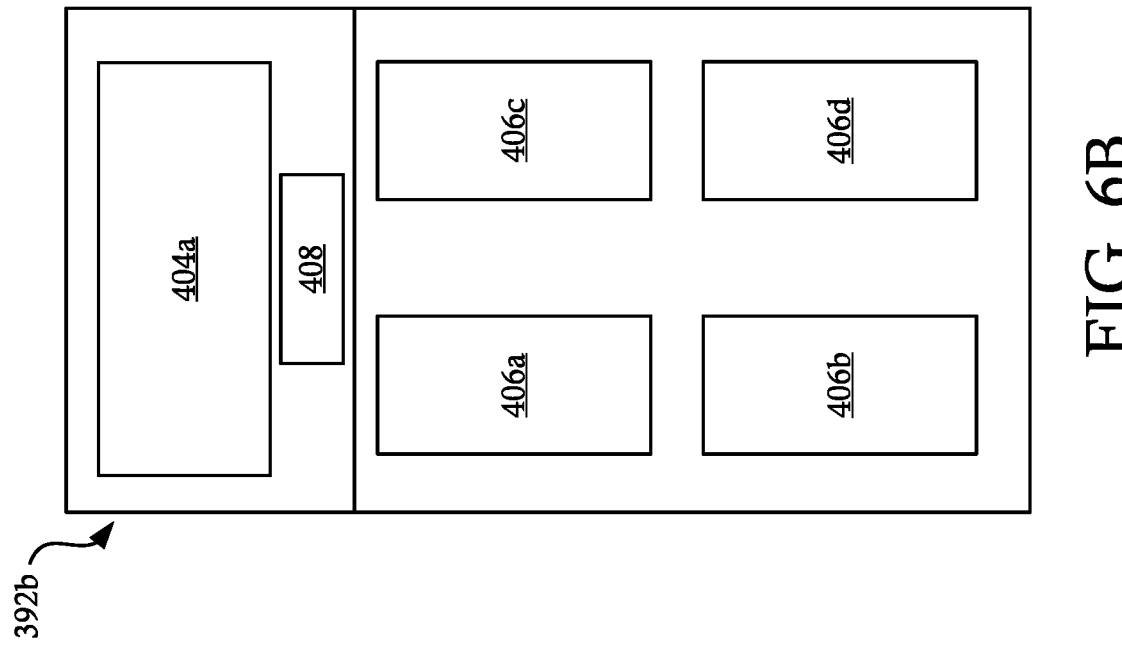
FIGS. 6A-6C illustrate embodiments of e-commerce interfaces including one or interface elements representative of one or more user relevant bundles and/or one or more ranked elements, in accordance with some embodiments.
Figure 6A:
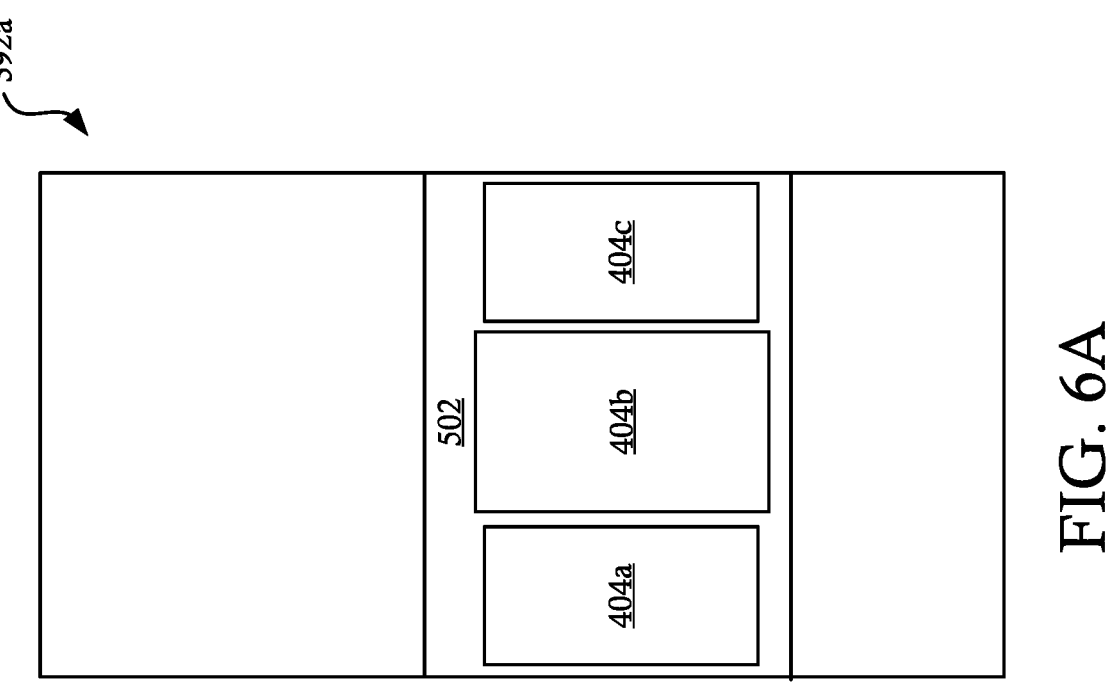
Figure 6C:
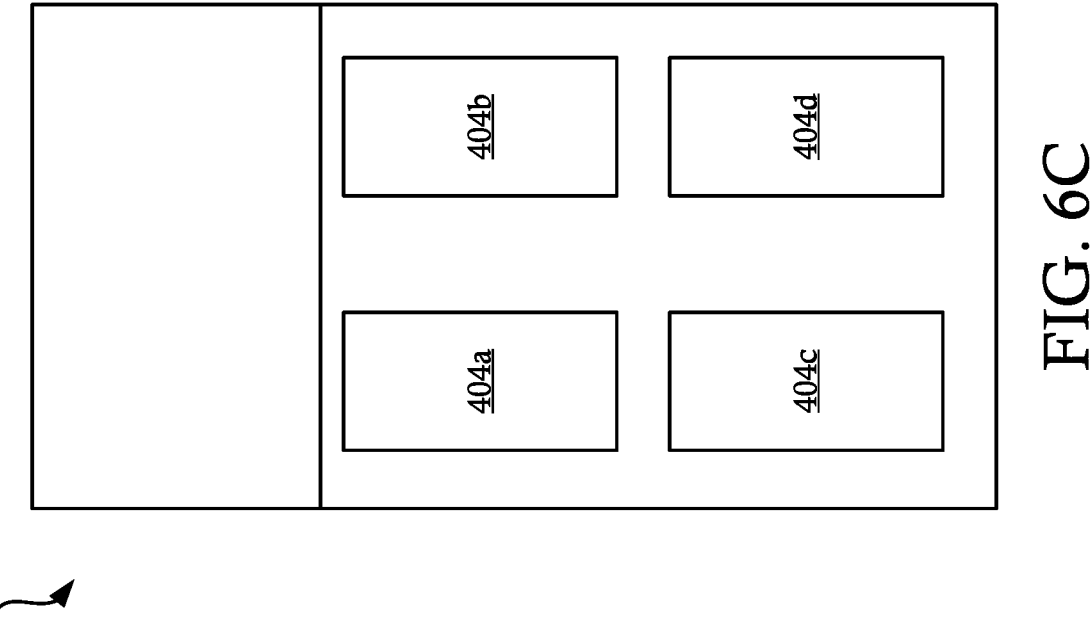

FIGS. 6A-6C illustrate various example e-commerce interfaces 392a-392c including one or interface elements representative of one or more user-relevant element bundles 358, one or more ranked elements 390 corresponding to at least one of the one or more user relevant bundles 358a, and additional interface elements configured to allow interaction with each of the user-relevant element bundles 358 and/or the one or more ranked elements 390, in accordance with some embodiments. Although embodiments are illustrated and discussed in the context of an e-commerce environment, it will be appreciated that any suitable interfaces may be generated for any suitable network environment. FIG. 6A illustrates an initial bundle interface 392a including a personalized bundle interface portion 502 including a set of user relevant bundle interface elements 404a-404c representative of user relevant element bundles. A user interaction with one of the user relevant bundle interface elements 404a-404c may cause the user interface to transition to a bundle-specific interface, such as the bundle-specific interface 392b illustrated in FIG. 6B.

As shown in FIG. 6B, in some embodiments, a bundle-specific interface 392b includes a plurality of item interface elements 406a-406d representative of elements associated with a selected user relevant bundle interface element 404a. The bundle-specific interface 392b may further include a bundle selection interface element 408 configured to allow a user to interact with (e.g., clip, claim, etc.) the element bundle associated with the selected user relevant bundle interface element 404a.

FIG. 6C illustrates a bundle selection interface 392c including a set of user relevant bundle interface elements 404a-404d representative of user relevant bundles, in accordance with some embodiments. As shown in FIG. 6C, a bundle selection interface 392d, and/or any other suitable interface, may include multiple user relevant bundle interface elements 404a-404d configured to allow selection of and/or interaction with (e.g., clipping) multiple user relevant element bundles. The set of user relevant bundle interface elements 404a-404d can include internally related and/or unrelated bundle interface elements, in various embodiments.

In some embodiments, a personalized user interface 392 is configured to enable coordination between activities performed at a physical location and digital interactions facilitated by the personalized user interface 392. For example, a user may interact with a personalized user interface 392 to select one or more user relevant bundle interface elements. The user may then proceed to a physical location at which physical elements associated with the selected user relevant bundle interface elements are present. As a user navigates and interacts with the physical elements, the user may also input data into a computing device. When an interaction with a physical element corresponds to an interaction with an elements associated with an element bundle, a computing device, such as a user computing device 16, may transmit data to one or more other devices, such as a affinity-driven interface generation computing device 4, to perform operations similar to those performed when a user interacts with a digital interface element associated with a selected element bundle.

As one non-limiting example, in the context of an e-commerce network environment, a user may interact with one or more e-commerce interfaces to select one or more offers including a set of items associated with the one or more offers. A user may be located at and/or become located at a physical location including a physical store operated by an entity associated with the e-commerce network environment. When a user interacts with products, e.g., physical items, within the physical store, a user may scan such products with a mobile computing device, such as a user computing device 16, to obtain and/or generate digital information related to the products. When a user interacts with a product, for example, by scanning the product, that corresponds to an item associated with one or more selected offers, an e-commerce interface may be operated to update a list of selected products including adjustments and/or actions executed in response to selection of both an offer and an item associated with an offer, as discussed above.

Figure 7:
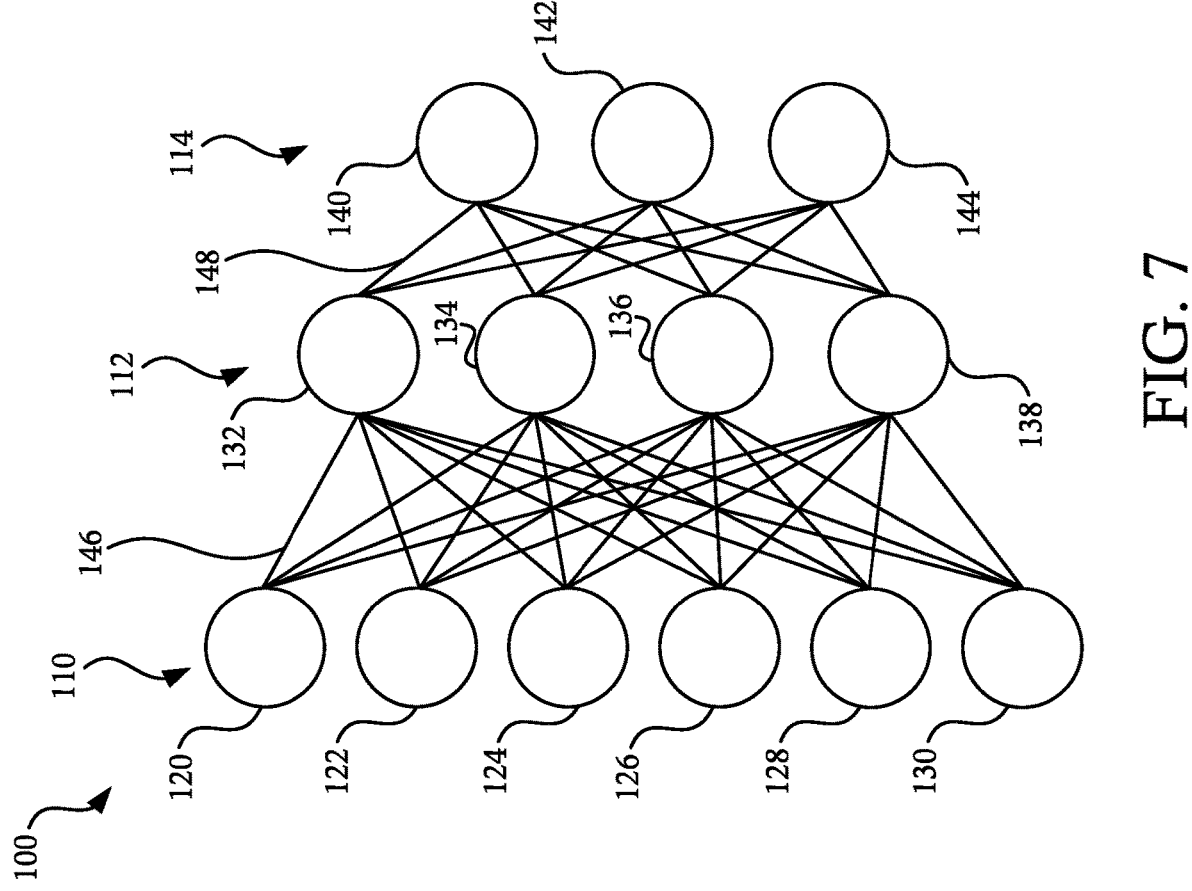
FIG. 7 illustrates an artificial neural network, in accordance with some embodiments.

FIG. 7 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 7 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 may be arranged in layers 110-114, wherein the layers may comprise an intrinsic order introduced by the edges 146-148 between the nodes 120-144 such that edges 146-148 exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 may be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number may be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 may comprise a weight being a real number, in particular, the weight is a real number within the interval $[-1, 1]$, within the interval $[0, 1]$, and/or within any other suitable interval. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 may be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 may be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}'^{(n)} = w_{i,j}^{(n)} - \gamma \cdot \delta_j^{(n)} \cdot x_i^{(n)}$$

wherein $\gamma$ is a learning rate, and the numbers $\delta_j^{(n)}$ may be recursively calculated as $$\delta_j^{(n)} = \left( \sum_k \delta_k^{(n+1)} \cdot w_{j,k}^{(n+1)} \right) \cdot f' \left( \sum_i x_i^{(n)} \cdot w_{i,j}^{(n)} \right)$$

based on $\delta_j^{(n+1)}$, if the (n+1)-th layer is not the output layer, and $$\delta_j^{(n)} = \left( x_k^{(n+1)} - t_j^{(n+1)} \right) \cdot f' \left( \sum_i x_i^{(n)} \cdot w_{i,j}^{(n)} \right)$$

if the (n+1)-th layer is the output layer 114, wherein f' is the first derivative of the activation function, and $y_j^{(n+1)}$ is the comparison training value for the j-th node of the output layer 114.

Figure 8:
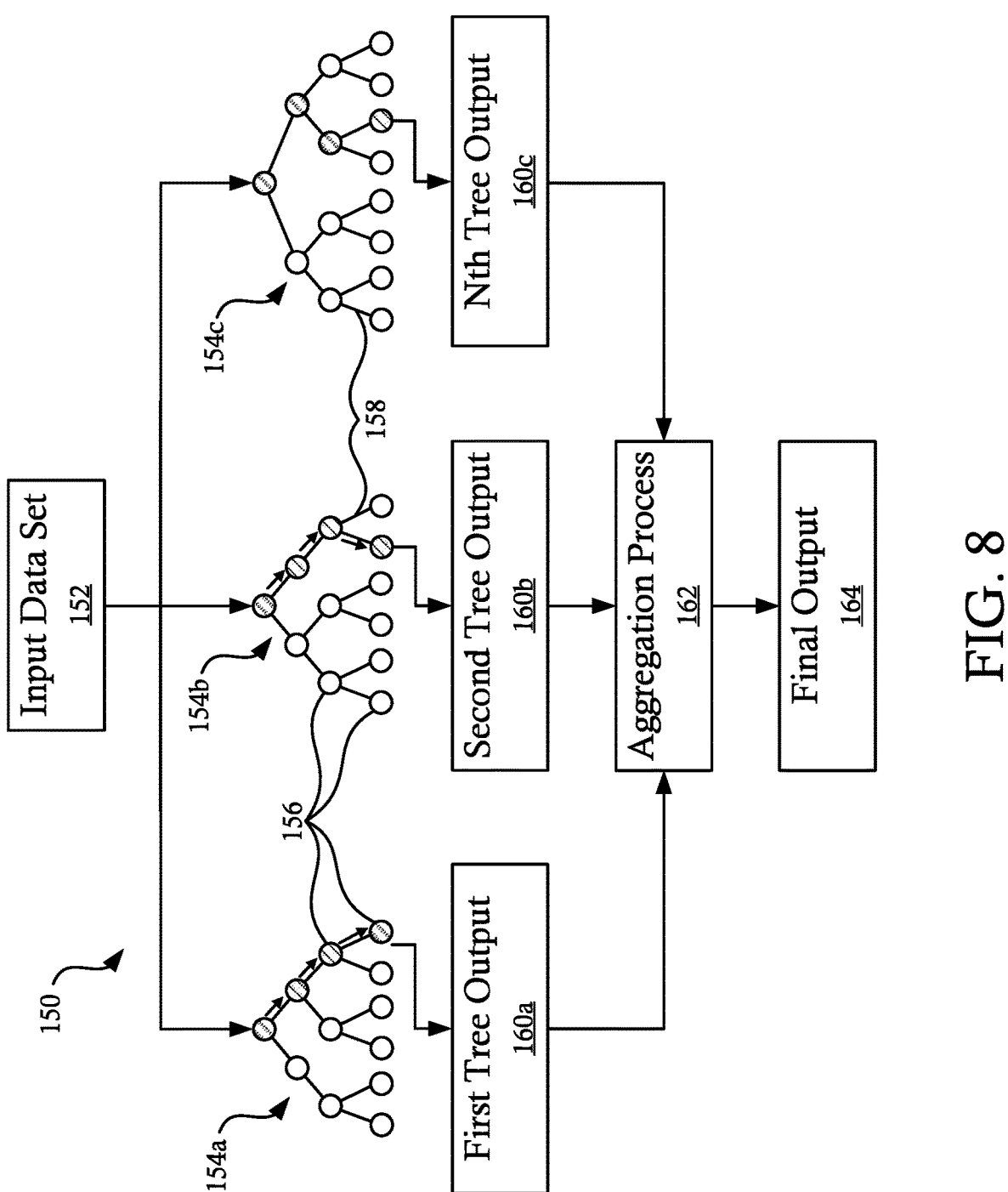
FIG. 8 illustrates a tree-based artificial neural network, in accordance with some embodiments.

FIG. 8 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c may include a classification and/or a regression tree (CART). Classification trees include a tree model in which a target variable may take a discrete set of values, e.g., may be classified as one of a set of values. In classification trees, each leaf 156 represents class labels and each of the branches 158 represents conjunctions of features that connect the class labels. Regression trees include a tree model in which the target variable may take continuous values (e.g., a real number value).

In operation, an input data set 152 including one or more features or attributes is received. A subset of the input data set 152 is provided to each of the trained decision trees 154a-154c. The subset may include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 may apply a majority-voting process to identify a classification selected by the majority of the trained decision trees 154a-154c. As another example, in embodiments including regression trees, the tree-based neural network 150 may apply an average, mean, and/or other mathematical process to generate a composite output of the trained decision trees. The final output 164 is provided as an output of the tree-based neural network 150.

Figure 9:
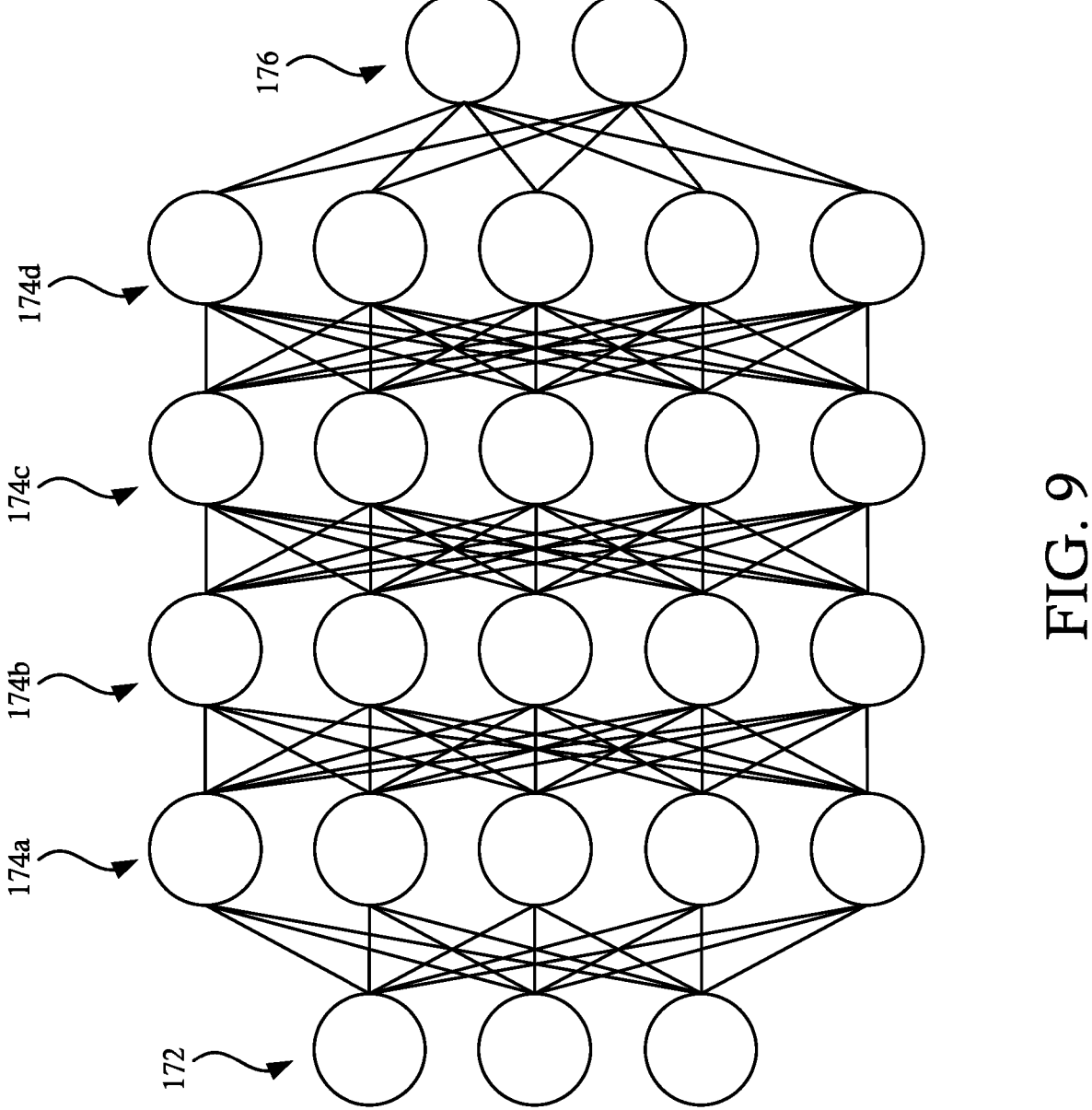
FIG. 9 illustrates a deep neural network (DNN), in accordance with some embodiments.

FIG. 9 illustrates a deep neural network (DNN) 170, in accordance with some embodiments. The DNN 170 is an artificial neural network, such as the neural network 100 illustrated in conjunction with FIG. 7, that includes representation learning. The DNN 170 may include an unbounded number of (e.g., two or more) intermediate layers 174a-174d each of a bounded size (e.g., having a predetermined number of nodes), providing for practical application and optimized implementation of a universal classifier. Each of the layers 174a-174d may be heterogenous. The DNN 170 may be configured to model complex, non-linear relationships. Intermediate layers, such as intermediate layer 174c, may provide compositions of features from lower layers, such as layers 174a, 174b, providing for modeling of complex data.

In some embodiments, the DNN 170 may be considered a stacked neural network including multiple layers each configured to execute one or more computations. The computation for a network with L hidden layers may be denoted as:

$$f(x) = f\left[ a^{(L+1)}\left( h^{(L)}\left( a^{(L)}\left( \ldots \left( h^{(2)}\left( a^{(2)}\left( h^{(1)}\left( a^{(1)}(x) \right) \right) \right) \right) \right) \right) \right) \right]$$

where $\alpha^{(l)}(x)$ is a preactivation function and $h^{(l)}(x)$ is a hidden-layer activation function providing the output of each hidden layer. The preactivation function $\alpha^{(l)}(x)$ may include a linear operation with matrix $W^{(l)}$ and bias $b^{(l)}$, where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 may include a backpropagation network in which the output of at least one hidden layer is provided, e.g., propagated, to a prior hidden layer. The DNN 170 may include any suitable neural network, such as a self-organizing neural network, a recurrent neural network, a convolutional neural network, a modular neural network, and/or any other suitable neural network.

In some embodiments, a DNN 170 may include a neural additive model (NAM). An NAM includes a linear combination of networks, each of which attends to (e.g., provides a calculation regarding) a single input feature. For example, a NAM may be represented as:

$$y = \beta + f_1(x_1) + f_2(x_2) + \ldots + f_K(x_K)$$

where $\beta$ is an offset and each $f_i$ is parametrized by a neural network. In some embodiments, the DNN 170 may include a neural multiplicative model (NMM), including a multiplicative form for the NAM mode using a log transformation of the dependent variable y and the independent variable x:

$$y = e^{\beta} e^{f(\log x)} e^{\Sigma_i f_i^d(d_i)}$$

where d represents one or more features of the independent variable x.

User features utilized for personalized of element bundles and/or associated elements may include user preference data for a user based on attributes associated with that user. For example, the user preference data may identify and characterize attributes associated with a user during a browsing session of a website. In some examples, more than one attribute per attribute category (e.g., brand, type, description) may be identified. When generating user preference data for a user, the affinity-driven interface generation computing device 4 may determine, for each attribute category, an attribute that is identified most often (e.g., a majority attribute). The attribute defined most often in each attribute category is stored as part of the corresponding user preference data. In some examples, a percentage score is generated for each attribute within an attribute category, and the percentage score is stored as part of the user preference data. The percentage score is based on a number of times a particular attribute is identified in a corresponding attribute category with respect to the number of times any attribute is identified in that attribute category. In some examples, the affinity-driven interface generation computing device 4 stores the user preference data in the database 14.

Identification of user-specific element bundles and/or user-relevant elements associated with selected element bundles can be burdensome and time consuming for users, especially if bundles and associated items are provided only in generalized catalogs. Typically, a user may locate information regarding element bundles and associated elements by navigating a browse structure, sometimes referred to as a "browse tree," in which interface pages or elements are arranged in a predetermined hierarchy. Such browse trees typically include multiple hierarchical levels, requiring users to navigate through several levels of browse nodes or pages to arrive at an interface page of interest. Thus, the user frequently has to perform numerous navigational steps to arrive at a page containing information regarding element bundles and subsequently perform additional operations to arrive at a page containing information regarding associated elements. In particular, current systems may require a user to generally browse a catalog of interface elements without providing any indication of elements associated with previously identified element bundles.

Systems including trained content selection models, as disclosed herein, significantly reduce this problem, allowing users to locate user-relevant element bundles and corresponding user-relevant elements with fewer, or in some case no, active steps. For example, in some embodiments described herein, when a user is presented with a user-relevant element bundle interface element, each interface element includes, or is in the form of, a link to an interface page for the corresponding user-relevant element bundle. Each recommendation thus serves as a programmatically selected navigational shortcut to an interface page, allowing a user to bypass the navigational structure of the browse tree. Beneficially, programmatically identifying user-relevant element bundles and/or associated elements and presenting a user with navigations shortcuts to these tasks may improve the speed of the user's navigation through an electronic interface, rather than requiring the user to page through multiple other pages via the browse tree or via a search function. This may be particularly beneficial for computing devices with small screens, where fewer interface elements are displayed to a user at a time and thus navigation of larger volumes of data is more difficult.

It will be appreciated that user-relevant content identification as disclosed herein, particularly on large datasets intended to be used with large network environments, is only possible with the aid of computer-assisted algorithms and techniques, such as the disclosed content selection models. In the disclosed embodiments, computer-implemented processes are utilized to perform operations that cannot practically be performed by a human, either mentally or with assistance, such as identification of user-relevant element bundles and/or user-relevant elements associated with selected element bundles in large network environments based on prior user interactions with the corresponding environment. It will be appreciated that a variety of computer-implemented techniques, as disclosed herein, may be implemented to provide an improvement to the operation of the computer system when identifying user-relevant element bundles and/or user-relevant elements or generating interfaces including such identified elements.

Figure 10:
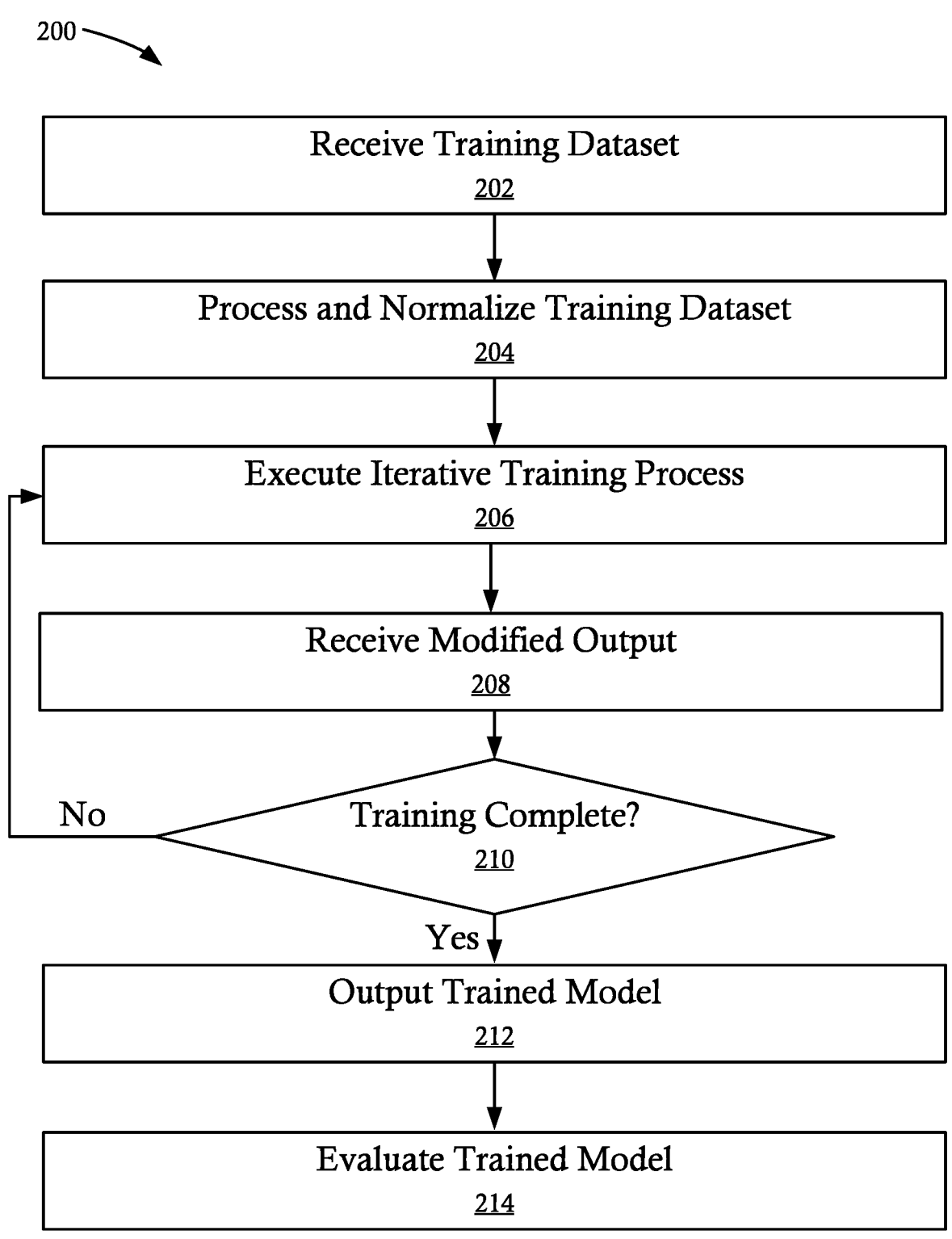
FIG. 10 is a flowchart illustrating a training method for generating a trained machine learning model, in accordance with some embodiments.
Figure 11:
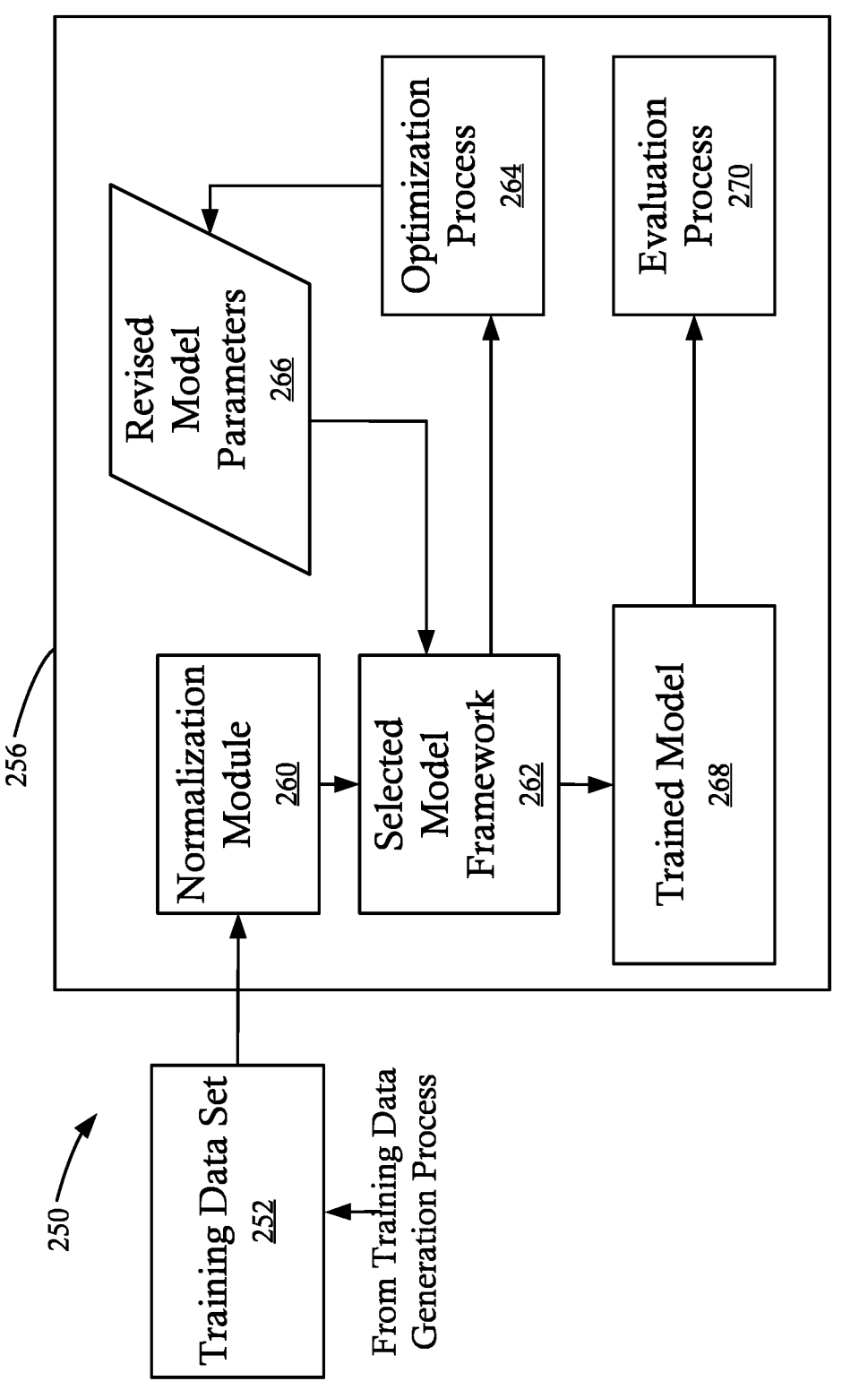
FIG. 11 is a process flow illustrating various steps of the training method of FIG. 10, in accordance with some embodiments.

In some embodiments, a content selection model can include and/or implement one or more trained models. In some embodiments, one or more trained models can be generated using an iterative training process based on a training dataset. FIG. 10 illustrates a method 200 for generating a trained model, such as a trained optimization model, in accordance with some embodiments. FIG. 11 is a process flow 250 illustrating various steps of the method 200 of generating a trained model, in accordance with some embodiments. At step 202, a training dataset 252 is received by a system, such as a processing device 10. The training dataset 252 can include labeled and/or unlabeled data.

At optional step 204, the received training dataset 252 is processed and/or normalized by a normalization module 260. For example, in some embodiments, the training dataset 252 can be augmented by imputing or estimating missing values of one or more features associated with user-relevant selections. In some embodiments, processing of the received training dataset 252 includes outlier detection configured to remove data likely to skew training of a content selection model. In some embodiments, processing of the received training dataset 252 includes removing features that have limited value with respect to training of the content selection model.

At step 206, an iterative training process is executed to train a selected model framework 262. The selected model framework 262 can include an untrained (e.g., base) machine learning model and/or a partially or previously trained model (e.g., a prior version of a trained model). The training process is configured to iteratively adjust parameters (e.g., hyperparameters) of the selected model framework 262 to minimize a cost value (e.g., an output of a cost function) for the selected model framework 262. In some embodiments, the cost value is related to selection of user-relevant element bundles.

The training process is an iterative process that generates set of revised model parameters 266 during each iteration. The set of revised model parameters 266 can be generated by applying an optimization process 264 to the cost function of the selected model framework 262. The optimization process 264 can be configured to reduce the cost value (e.g., reduce the output of the cost function) at each step by adjusting one or more parameters during each iteration of the training process.

After each iteration of the training process, at step 208, a determination is made whether the training process is complete. The determination at step 208 can be based on any suitable parameters. For example, in some embodiments, a training process can complete after a predetermined number of iterations. As another example, in some embodiments, a training process can complete when it is determined that the cost function of the selected model framework 262 has reached a minimum, such as a local minimum and/or a global minimum.

At step 210, a trained model 268, such as a trained content selection model, is output and provided for use in an interface generation process, such as the content selection and interface generation method 300 discussed above with respect to FIGS. 3-4. At optional step 212, a trained model 268 can be evaluated by an evaluation process 270. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a non-transitory memory;
a processor communicatively coupled to the non-transitory memory, wherein the processor is configured to read a set of instructions to:
receive an interface generation request;
in response to receiving the interface generation request, select a plurality of user-relevant element bundles, wherein the plurality of user-relevant element bundles is selected in part by a weighted random sampling process that includes converting a rank of each user-relevant element bundle in the plurality of user-relevant element bundles to a weight and defining a selection range for each user-relevant element bundle based on the weight;
in response to selecting the plurality of user-relevant element bundles, rank a set of interface elements associated with each of the plurality of user-relevant element bundles based on interface element relevance to a user associated with the interface generation request; and
transmit instructions to cause generation of an interface including at least one of the plurality of user-relevant element bundles and at least a top-ranked interface element selected from the set of interface elements associated with the at least one of the plurality of user-relevant element bundles.

2. The system of claim 1, wherein selection of the user-relevant element bundles comprises ranking a plurality of available element bundles based on a relevance to the user associated with the interface generation request.

3. The system of claim 2, wherein selection of the user-relevant element bundles comprises a transaction-based ranking process, and wherein the weighted random sampling process is applied after the transaction-based ranking process.

4. The system of claim 2, wherein the ranking of the available element bundles is based on one or more feature weights for one or more features associated with each of the available element bundles.

5. The system of claim 4, wherein ranking the set of interface elements associated with each of the plurality of user-relevant element bundles is based on one or more feature weights for one or more features associated with each interface element in the set of interface elements.

6. The system of claim 4, wherein the one or more feature weights are representative of a user affinity for each of the one or more features.

7. The system of claim 1, wherein the weighted random sampling process comprises:
normalizing each of the weights;
defining the selection range for each user-relevant element bundle based on the weight comprises defining the selection range for each user-relevant element bundle based on a corresponding one of the weights and the weight of a next-ranked user-relevant element bundle; and
selecting at least one user-relevant element bundle by randomly generating a number within an aggregated selection range for the plurality of user-relevant element bundles.

8. A computer-implemented method, comprising:
receiving an interface generation request;
in response to receiving the interface generation request, selecting a plurality of user-relevant element bundles, wherein the plurality of user-relevant element bundles is selected in part by a weighted random sampling process that includes converting a rank of each user-relevant element bundle in the plurality of user-relevant element bundles to a weight and defining a selection range for each user-relevant element bundle based on the weight;
in response to selecting the plurality of user-relevant element bundles, ranking a set of interface elements associated with each of the plurality of user-relevant element bundles based on interface element relevance to a user associated with the interface generation request; and
transmitting instructions to cause generation of an interface including at least one of the plurality of user-relevant element bundles and at least a top-ranked interface element selected from the set of interface elements associated with the at least one of the plurality of user-relevant element bundles.

9. The computer-implemented method of claim 8, wherein selection of the user-relevant element bundles comprises ranking a plurality of available element bundles based on a relevance to the user associated with the interface generation request.

10. The computer-implemented method of claim 9, wherein selection of the user-relevant element bundles comprises a transaction-based ranking process, and wherein the weighted random sampling process is applied after the transaction-based ranking process.

11. The computer-implemented method of claim 9, wherein the ranking of the available element bundles is based on one or more feature weights for one or more features associated with each of the available element bundles.

12. The computer-implemented method of claim 11, wherein ranking the set of interface elements associated with each of the plurality of user-relevant element bundles is based on one or more feature weights for one or more features associated with each interface element in the set of interface elements.

13. The computer-implemented method of claim 11, wherein the one or more feature weights are representative of a user affinity for each of the one or more features.

14. The computer-implemented method of claim 8, wherein the weighted random sampling process comprises:

normalizing each of the weights;

defining the selection range for each user-relevant element bundle based on the weight comprises defining the selection range for each user-relevant element bundle based on a corresponding one of the weights and the weight of a next-ranked user-relevant element bundle; and selecting at least one user-relevant element bundle by randomly generating a number within an aggregated selection range for the plurality of user-relevant element bundles.

15. A non-transitory computer readable medium having instructions stored thereon, wherein the instructions, when executed by at least one processor, cause at least one device to perform operations comprising:

receiving an interface generation request;

in response to receiving the interface generation request, selecting a plurality of user-relevant element bundles, wherein the plurality of user-relevant element bundles is selected in part by a weighted random sampling process that includes converting a rank of each user-relevant element bundle in the plurality of user-relevant element bundles to a weight and defining a selection range for each user-relevant element bundle based on the weight;

in response to selecting the plurality of user-relevant element bundles, ranking a set of interface elements associated with each of the plurality of user-relevant element bundles based on interface element relevance to a user associated with the interface generation request; and transmitting instructions to cause generation of an interface including at least one of the plurality of user-relevant element bundles and at least a top-ranked interface element selected from the set of interface elements associated with the at least one of the plurality of user-relevant element bundles.

16. The non-transitory computer readable medium of claim 15, wherein selection of the user-relevant element bundles comprises ranking a plurality of available element bundles based on a relevance to the user associated with the interface generation request.

17. The non-transitory computer readable medium of claim 16, wherein selection of the user-relevant element bundles comprises a transaction-based ranking process, and wherein the weighted random sampling process is applied after the transaction-based ranking process.

18. The non-transitory computer readable medium of claim 16, wherein the ranking of the available element bundles is based on one or more feature weights for one or more features associated with each of the available element bundles.

19. The non-transitory computer readable medium of claim 18, wherein ranking the set of interface elements associated with each of the plurality of user-relevant element bundles is based on one or more feature weights for one or more features associated with each interface element in the set of interface elements.

20. The non-transitory computer readable medium of claim 15, wherein the weighted random sampling process comprises:

normalizing each of the weights;

defining the selection range for each user-relevant element bundle based on the weight comprises defining the selection range for each user-relevant element bundle based on a corresponding one of the weights and the weight of a next-ranked user-relevant element bundle; and selecting at least one user-relevant element bundle by randomly generating a number within an aggregated selection range for the plurality of user-relevant element bundles.

\* \* \* \* \*